T. Grundmann.
Beer Cooler.

Nº 100,752. Patented Mar. 16, 1870.

WITNESSES:

INVENTOR:

United States Patent Office.

THEODORE GRÜNDMANN, OF CLEVELAND, OHIO.

Letters Patent No. 100,752, dated March 15, 1870; antedated March 5, 1870.

IMPROVED APPARATUS FOR COOLING BEER AND OTHER LIQUIDS.

The Schedule referred to in these Letters Patent and making part of the same

*To all whom it may concern:*

Be it known that I, THEODORE GRÜNDMANN, of Cleveland, in the county of Cuyahoga, and State of Ohio, have invented a new and improved Cooling-Apparatus; and I do hereby declare that the following is a full, clear, and exact description thereof, which will enable others skilled in the art to make and use the same, reference being had to the accompanying drawings forming part of this specification, in which—

Similar letters of reference indicate corresponding parts.

This invention relates to a new apparatus for cooling mash-beer and other liquids, and consists in a novel arrangement of pipes, passages, and vessels for obtaining the desired result, namely, the rapid and thorough cooling of the liquid, and the absolute discharge of the warmed cooling-liquid.

Figure 1:
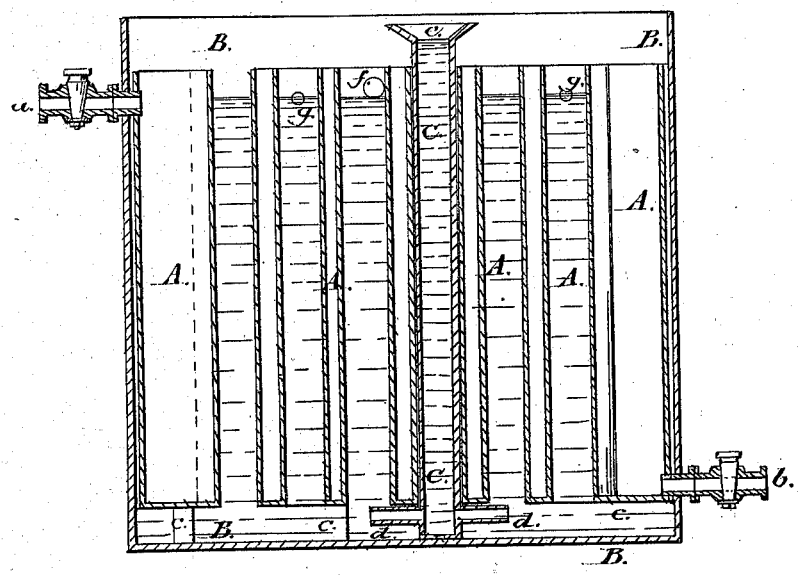
Figure 1 represents a sectional elevation of my improved cooling-apparatus.
Figure 2:
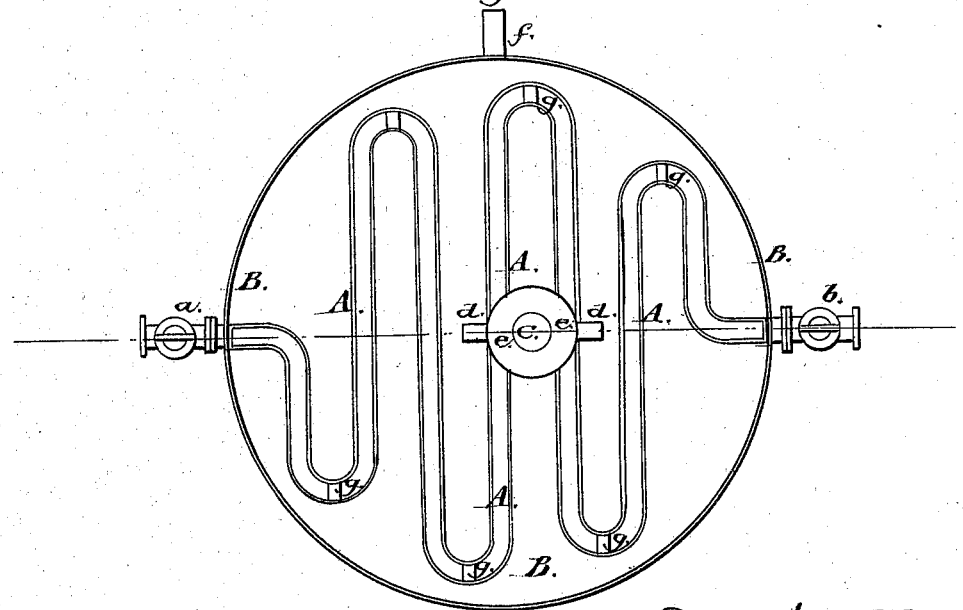
Figure 2 is a plan or top view of the same.

The cooling-vessel A is made of serpentine form, as shown in fig. 2, it forming a narrow vertical channel, open on top or closed, and adapted to receive at one end the liquid which is to be cooled, near the top, through a pipe, *a*, and to discharge it near the bottom, at the other end, through a pipe, *b*.

This serpentine vessel A is placed into a vessel, B, which is of cylindrical or other suitable form, and which is somewhat higher than A, so that the latter may be raised above the bottom of B, on legs or supports *c*, as shown.

A vertical pipe, C, having horizontal branches *d d* or a rose at its lower end, is placed into the vessel B, and has a funnel, *e*, at its upper end.

The cooling-liquid, such as water or other substance, is poured into the funnel, and is in the pipe C conducted to the bottom of the vessel B, where it is spread by the branches *d*. The warm cooling-liquid arises to the top, and flows out through a pipe, *f*.

Small pipes *g g* are fitted through the serpentine vessel, to facilitate the circulation of the cooling-liquid.

The mash or beer, as it passes through the vessel A, is thoroughly cooled, and the cooling-liquid, as it gets warm, is discharged.

Having thus described my invention,

I claim as new and desire to secure by Letters Patent—

1. The arrangement in a cooling-chamber, B, of a serpentine vessel A, raised above the bottom of said chamber, and surrounded by the cooling-fluid on every side, as shown and described.

2. The improved serpentine vessel A, having an inlet-pipe, *a*, at the top of chamber B, and an outlet-pipe, *b*, at the bottom thereof, to allow the warm liquid to flow through the cooling-fluid, and be deprived of its caloric, in the manner described.

3. The combination of a surrounding chamber, B, having induction-pipe C in the center, and the eduction-pipe *f* on the rim thereof, to admit of a constant flow and change of the cooling-fluid, with a vessel, A, through which the liquid to be cooled flows, in the manner set forth, each of said vessels being constructed and arranged in respect to the other, as and for the purpose specified.

THEODORE GRÜNDMANN.

Witnesses:
GEO. A. KOLBE,
FRED. H. BIERMANN.